(12) United States Patent
Khan et al.

(10) Patent No.: US 8,254,492 B2
(45) Date of Patent: *Aug. 28, 2012

(54) TRANSMIT DIVERSITY IN A WIRELESS COMMUNICATION SYSTEM

(75) Inventors: Farooq Khan, Allen, TX (US);
Jianzhong Zhang, Irving, TX (US);
Jiann-An Tsai, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1206 days.

This patent is subject to a terminal disclaimer.

(21) Appl. No.: 12/005,341

(22) Filed: Dec. 27, 2007

(65) Prior Publication Data
US 2008/0267310 A1 Oct. 30, 2008

Related U.S. Application Data

(60) Provisional application No. 60/924,021, filed on Apr. 26, 2007, provisional application No. 60/924,338, filed on May 9, 2007.

(51) Int. Cl.
*H04L 27/00* (2006.01)
(52) U.S. Cl. ............ 375/295; 375/260; 375/267
(58) Field of Classification Search .......... 375/267, 375/260, 130, 299, 347, 295; 370/208, 210
See application file for complete search history.

(56) References Cited

U.S. PATENT DOCUMENTS

| | | | |
|---|---|---|---|
| 6,693,889 B1 * | 2/2004 | Abe et al. .............. | 370/342 |
| 7,002,900 B2 | 2/2006 | Walton et al. | |
| 7,308,035 B2 * | 12/2007 | Rouquette et al. ........ | 375/267 |
| 2005/0190853 A1 | 9/2005 | Tirkkonen | |
| 2005/0281350 A1 * | 12/2005 | Chae et al. ............ | 375/267 |
| 2006/0034383 A1 * | 2/2006 | Su et al. ................ | 375/267 |
| 2006/0039500 A1 * | 2/2006 | Yun et al. .............. | 375/299 |
| 2006/0093062 A1 * | 5/2006 | Yun et al. .............. | 375/267 |
| 2007/0183527 A1 | 8/2007 | Jia et al. | |
| 2007/0217531 A1 * | 9/2007 | Kwon et al. ............ | 375/260 |

(Continued)

FOREIGN PATENT DOCUMENTS

EP 1 679 816 A1 7/2006
(Continued)

OTHER PUBLICATIONS

International Search Report dated Aug. 6, 2008 in connection with International Patent Application No. PCT/KR2008/002335.

*Primary Examiner* — Shuwang Liu
*Assistant Examiner* — Helene Tayong

(57) ABSTRACT

A method for transmitting data via multiple antennas by modulating data to be transmitted into a plurality of modulated symbols, encoding each pair of modulated symbols from among said plurality of symbols in accordance with a transmission diversity scheme to result in a plurality of N by N matrices, with each N by N matrix corresponding to each pair of modulated symbols, generating a M by M code matrix comprised of the plurality of N by N matrices, orthogonally spreading the M by M code matrix to generate an output matrix, generating a plurality of row-permuted matrices by exchanging at least one pair of rows in the output matrix, and transmitting the symbols in the plurality of row-permuted matrices via a plurality of antennas by using either a space time transmission diversity scheme, a space frequency transmission diversity scheme, or a combination of a space time transmission diversity scheme and a space frequency transmission diversity scheme.

27 Claims, 12 Drawing Sheets

U.S. PATENT DOCUMENTS

| | | | | |
|---|---|---|---|---|
| 2007/0245203 | A1* | 10/2007 | Cho et al. | 714/748 |
| 2008/0151831 | A1* | 6/2008 | Khan et al. | 370/330 |
| 2008/0192846 | A1* | 8/2008 | Bjerke et al. | 375/260 |
| 2008/0259862 | A1* | 10/2008 | Yeo et al. | 370/329 |
| 2009/0074093 | A1* | 3/2009 | Han et al. | 375/260 |
| 2009/0323863 | A1* | 12/2009 | Lee et al. | 375/308 |
| 2010/0226415 | A1* | 9/2010 | Mehta et al. | 375/219 |

FOREIGN PATENT DOCUMENTS

| | | |
|---|---|---|
| JP | 2005513953 A | 5/2005 |
| JP | 2006191645 A | 7/2006 |
| KR | 1020060040245 | 5/2006 |
| WO | WO 03/056742 A1 | 7/2003 |
| WO | WO 2006/049443 A1 | 5/2006 |
| WO | WO 2006/102254 A1 | 9/2006 |

* cited by examiner

FIG. 2

|  | t1 | t2 |
|---|---|---|
| ANT 1 | $S_1$ | $-S_2^*$ |
| ANT 2 | $S_2$ | $S_1^*$ |

FIG. 3

|  | f1 | f2 |
|---|---|---|
| ANT 1 | $S_1$ | $-S_2^*$ |
| ANT 2 | $S_2$ | $S_1^*$ |

FIG. 4

|  | f1 | f2 |
|---|---|---|
| ANT 1 | $S_1$ | $S_2$ |
| ANT 2 | $-S_2^*$ | $S_1^*$ |

FIG. 8

| | t1 | t2 | t3 | t4 |
|---|---|---|---|---|
| ANT 1 | $S_1$ | $-S_2^*$ | $S_1$ | $-S_2^*$ |
| ANT 2 | $S_2$ | $S_1^*$ | $S_2$ | $S_1^*$ |
| ANT 3 | $S_3$ | $-S_4^*$ | $-S_3$ | $S_4^*$ |
| ANT 4 | $S_4$ | $S_3^*$ | $-S_4$ | $-S_3^*$ |

FIG. 9

|  | t1 | t2 | t3 | t4 |
|---|---|---|---|---|
| ANT 1 | $S_1$ | $-S_2^*$ | $S_1$ | $-S_2^*$ |
| ANT 2 | $S_3$ | $-S_4^*$ | $-S_3$ | $S_4^*$ |
| ANT 3 | $S_2$ | $S_1^*$ | $S_2$ | $S_1^*$ |
| ANT 4 | $S_4$ | $S_3^*$ | $-S_4$ | $-S_3^*$ |

FIG. 10

|      | t1    | t2       | t3    | t4       |
|------|-------|----------|-------|----------|
| ANT 1 | $S_1$ | $-S_2^*$ | 0     | 0        |
| ANT 2 | 0     | 0        | $S_3$ | $-S_4^*$ |
| ANT 3 | $S_2$ | $S_1^*$  | 0     | 0        |
| ANT 4 | 0     | 0        | $S_4$ | $S_3^*$  |

$$\frac{1}{\sqrt{4}}\begin{bmatrix} S_1 & -S_2^* & S_1 & -S_2^* \\ S_2 & S_1^* & S_2 & S_1^* \\ jS_3 & -jS_4^* & -jS_3 & jS_4^* \\ jS_4 & jS_3^* & -jS_4 & -jS_3^* \end{bmatrix}$$

$$\frac{1}{\sqrt{4}}\begin{bmatrix} S_3 & -S_4^* & S_3 & -S_4^* \\ S_4 & S_3^* & S_4 & S_3^* \\ jS_1 & -jS_2^* & -jS_1 & jS_2^* \\ jS_2 & jS_1^* & -jS_2 & -jS_1^* \end{bmatrix}$$

1st Tx — 1 2 3 4

ReTx — 5 6 7 8

NACK

TRANSMIT DIVERSITY IN A WIRELESS COMMUNICATION SYSTEM

CLAIM OF PRIORITY

This application makes reference to, incorporates the same herein, and claims all benefits accruing under 35 U.S.C. §119 from provisional applications earlier filed in the U.S. Patent & Trademark Office on 26 Apr. 2007 and there duly assigned Ser. No. 60/924,021, and filed on 9 May 2007 and assigned Ser. No. 60/924,338.

BACKGROUND OF THE INVENTION

1. Field of the Invention

The present invention relates to a method for transmitting data in a communication system, and more specifically, a process and circuits for transmitting information using multiple antennas transmission diversity scheme.

2. Description of the Related Art

A typical cellular radio system includes a number of fixed base stations and a number of mobile stations. Each base station covers an geographical area, which is defined as a cell.

Typically, a non-line-of-sight (NLOS) radio propagation path exists between a base station and a mobile station due to natural and man-made objects disposed between the base station and the mobile station. As a consequence, radio waves propagate while experiencing reflections, diffractions and scattering. The radio wave which arrives at the antenna of the mobile station in a downlink direction, or at the antenna of the base station in an uplink direction, experiences constructive and destructive additions because of different phases of individual waves generated due to the reflections, diffractions, scattering and out-of-phase recombination. This is due to the fact that, at high carrier frequencies typically used in a contemporary cellular wireless communication, small changes in differential propagation delays introduces large changes in the phases of the individual waves. If the mobile station is moving or there are changes in the scattering environment, then the spatial variations in the amplitude and phase of the composite received signal will manifest themselves as the time variations known as Rayleigh fading or fast fading attributable to multipath reception. The time-varying nature of the wireless channel require very high signal-to-noise ratio (SNR) in order to provide desired bit error or packet error reliability.

The scheme of diversity is widely used to combat the effect of fast fading by providing a receiver with multiple faded replicas of the same information-bearing signal.

The schemes of diversity in general fall into the following categories: space, angle, polarization, field, frequency, time and multipath diversity. Space diversity can be achieved by using multiple transmit or receive antennas. The spatial separation between the multiple antennas is chosen so that the diversity branches, i.e., the signals transmitted from the multiple antennas, experience fading with little or no correlation. Transmit diversity, which is one type of space diversity, uses multiple transmission antennas to provide the receiver with multiple uncorrelated replicas of the same signal. Transmission diversity schemes can further be divided into open loop transmit diversity and closed-loop transmission diversity schemes. In the open loop transmit diversity approach no feedback is required from the receiver. In one type of closed loop transmit diversity, a receiver knows an arrangement of transmission antennas, computes a phase and amplitude adjustment that should be applied at the transmitter antennas in order to maximize a power of the signal received at the receiver. In another arrangement of closed loop transmit diversity referred to as selection transmit diversity (STD), the receiver provides feedback information to the transmitter regarding which antenna(s) to be used for transmission.

An example of open-loop transmission diversity scheme is the Alamouti 2×1 space-time diversity scheme. The Alamouti 2×2 space-time diversity scheme contemplates transmitting a Alamouti 2×2 block code using two transmission antennas using either two time slots (i.e., Space Time Block Code (STBC) transmit diversity) or two frequency subcarriers (i.e., Space Frequency Block Code (SFBC) transmit diversity).

One limitation of Alamouti 2×1 space-time diversity scheme is that this scheme can only be applied to two transmission antennas. In order to transmit data using four transmission antennas, a Frequency Switched Transmit Diversity (FSTD) or a Time Switched Transmit Diversity (TSTD) is combined with block codes. In case of combined SFBC+FSTD scheme or STBC+TSTD scheme, the matrix of the transmitted symbols from the four transmission antennas may be given as:

$$\begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_1 & S_2 & 0 & 0 \\ -S_2^* & S_1^* & 0 & 0 \\ 0 & 0 & S_3 & S_4 \\ 0 & 0 & -S_4^* & S_3^* \end{bmatrix} \quad (1)$$

where $T_{ij}$ represents symbol transmitted on the ith antenna and the jth subcarrier or jth time slot, and i=1, 2, 3, 4, j=1, 2, 3, 4 for the case of four transmission antennas, where $S_1$, $S_2$, $S_3$ and $S_4$ are symbols to be transmitted.

The problem with combined SFBC+FSTD scheme and STBC+TSTD schemes is that only a fraction of the total transmission antennas and hence power amplifier capability is used for transmission in a given frequency or time resource. This is indicated by '0' elements in the SFBC+FSTD and STBC+TSTD matrix given above. When the transmit power on the non-zero elements in the matrix is increased, bursty interference is generated to the neighboring cells degrading system performance. Generally, bursty interference manifests itself when certain phases of a frequency hopping pattern incur more interference than other phases.

SUMMARY OF THE INVENTION

It is therefore an object of the present invention to provide an improved method and transmitter circuit for transmitting data via multiple antennas.

It is another object to provide a method and transmitter circuit for transmitting data using multiple antennas transmission diversity scheme.

According to one aspect of the present invention, a method for data transmission contemplates modulating data to be transmitted into a plurality of modulated symbols, dividing the plurality of modulated symbols into a plurality of subsets of modulated symbols, with each subset having N modulated symbols, and N being an integer no smaller than 2, encoding each subset of modulated symbols in accordance with a transmission diversity scheme to produce a plurality of N by N matrices, with each N by N matrix corresponding to each pair of modulated symbols, generating a first M by M code matrix comprised of the plurality of N by N matrices, orthogonally spreading the first M by M code matrix to generate a first output matrix, and transmitting the symbols in the first output matrix via a plurality of antennas in a first time slot.

The method may further include exchanging a selected pair of rows in the first M by M code matrix to generate a second M by M code matrix, orthogonally spreading the second M by M code matrix to generate a second output matrix, and transmitting the symbols in the second output matrix via the plurality of antennas in a second time slot.

The transmission diversity scheme may be an Alamouti diversity scheme, and each of the N by N matrices may be established by:

$$A = \frac{1}{\sqrt{2}}\begin{bmatrix} S_1 & S_2 \\ -S_2^* & S_1^* \end{bmatrix}$$

where N=2, and $S_1$ and $S_2$ are one pair of the modulated symbols.

Alternatively, each of the N by N matrices may be established by:

$$A = \frac{1}{\sqrt{2}}\begin{bmatrix} S_1 & -S_2^* \\ S_2 & S_1^* \end{bmatrix}$$

where N=2, and $S_1$ and $S_2$ are one pair of the modulated symbols.

The first M by M code matrix may be established by:

$$C = \begin{bmatrix} A_1 & A_1 & \cdots & A_1 \\ A_2 & A_2 & \cdots & A_2 \\ \vdots & \vdots & \ddots & \vdots \\ A_x & A_x & \cdots & A_x \end{bmatrix}$$

where $A_1$ through $A_x$ are the plurality of N by N matrices, X is the number of the plurality of N by N matrices, and M=N×X.

The orthogonal spreading of the plurality of N by N matrices being performed according to a Fourier matrix, and each element of the Fourier matrix being established by:

$$P_{mn} = e^{j2\pi \frac{m}{N}\left(n+\frac{g}{G}\right)},$$

where m, n=0, 1, . . . (N−1), G=N×N, m is the row number of the matrix, n is the column number of the matrix, and g is selected to be any number between 0 and G−1.

Alternatively, the orthogonal spreading of the plurality of N by N matrices being performed according to a Zadoff-Chu sequence, and an n-th entry $c_k(n)$ of a k-th Zadoff-Chu sequence being established by:

$$c_k(n) = e^{j2\pi k \frac{n(n+1)/2+qn}{L}}$$

where L is a positive odd integer $$c_k(n) = e^{j2\pi k \frac{n^2/2+qn}{L}}$$

where L is a positive even integer
where k is an integer which is relatively prime with L, and q is an integer.

Still alternatively, the orthogonal spreading of the plurality of N by N matrices being performed according to a Hadamard matrix, and a Hadamard matrix of order n being established by:

$$H_n H_n^T = nI_n$$

where $I_n$ is an n×n identity matrix.

The first output matrix may be generated by generating an M by M spreading matrix which is a Kronecker product of an N by N orthogonally spreading matrix and an X by X matrix with all elements being 1, and orthogonally spreading the first M by M code matrix by an element-wise multiplication of the M by M code matrix and the M by M spreading matrix.

The symbols in the second output matrix may be transmitted in response to a negative acknowledgement signal received from a receiver.

The method may further include generating a set of row-permuted matrixes based upon the first output matrix, each row-permuted matrix being generated by exchanging a selected pair of rows in the output matrix, segregating the available transmission resource into a plurality of frequency sub-carriers, dividing the plurality of sub-carriers into a plurality of subsets of continuous sub-carriers, each subset of sub-carriers comprising M sub-carriers, selecting a subset of K row-permuted matrices to be mapped into the transmission resources, repeatedly mapping the selected set of K row-permuted matrices into the plurality of sets of sub-carriers, with each set of M sub-carriers corresponding to a row-permuted matrix, and transmitting the symbols in the selected row-permuted matrices using the corresponding sub-carriers via a plurality of antennas.

The method may further include generating a set of row-permuted matrixes based upon the first output matrix, each row-permuted matrix being generated by exchanging a selected pair of rows in the output matrix, selecting a subset of K row-permuted matrices, and transmitting the symbols in the selected subset of row-permuted matrices in different time slots, with the symbols in each row-permuted matrix being transmitted in one time slot.

The method may further include generating a set of row-permuted matrixes based upon the first output matrix, each row-permuted matrix being generated by exchanging a selected pair of rows in the output matrix, selecting a subset of K row-permuted matrices, segregating available transmission resources into a plurality of frequency sub-carriers, dividing the plurality of sub-carriers into a plurality of sets of continuous sub-carriers, each set of sub-carriers comprising M sub-carriers, selecting a subset of K row-permuted matrices to be mapped into the transmission resources, repeatedly mapping the selected set of K row-permuted matrices into the plurality of sets of sub-carriers, with each set of M sub-carriers corresponding to a row-permuted matrix, and transmitting the symbols in the selected row-permuted matrices using the corresponding sub-carriers via a plurality of antennas in different time slots.

According to another aspect of the present invention, a transmitter is constructed with a modulator modulating data to be transmitted into a plurality of modulated symbols, a precoding unit dividing the plurality of modulated symbols into a plurality of subsets, and encoding each subset of modulated symbols from among said plurality of symbols in accordance with a transmission diversity scheme to result in a plurality of N by N matrices, with each N by N matrix corresponding to each pair of modulated symbols, a spreading unit orthogonally spreading the plurality of N by N matrices to generate an output matrix, a permutation unit for permuting at least one pair of rows in the output matrix to generate a plurality of row-permuted matrices, a mapping unit for mapping the symbols in the plurality of row-permuted matrices into available transmission resources, and a plurality of antennas for transmitting the symbols in the plurality of row-permuted matrices.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 2 is an illustration of a Space Time Block Code transmission diversity scheme for two transmission antennas;

FIG. 3 is an illustration of a Space Frequency Block Code transmission diversity scheme for two transmission antennas;

FIG. 4 is an illustration of an alternative Space Frequency Block Code transmission diversity scheme for two transmission antennas;

FIG. 8 is an illustration of a transmission diversity scheme for four transmission antennas according to a first embodiment of the principles of the present invention;

FIG. 9 is an illustration of a transmission diversity scheme for four transmission antennas according to a second embodiment of the principles of the present invention;

FIG. 10 is an illustration of a transmission diversity scheme for four transmission antennas according to a third embodiment of the principles of the present invention;

DETAILED DESCRIPTION OF THE INVENTION

The present invention will be described more fully hereinafter with reference to the accompanying drawings, in which preferred embodiments of the invention are shown. As those skilled in the art would realize, the described embodiments may be modified in various different ways, all without departing from the spirit or scope of the present invention.

Figure 1:
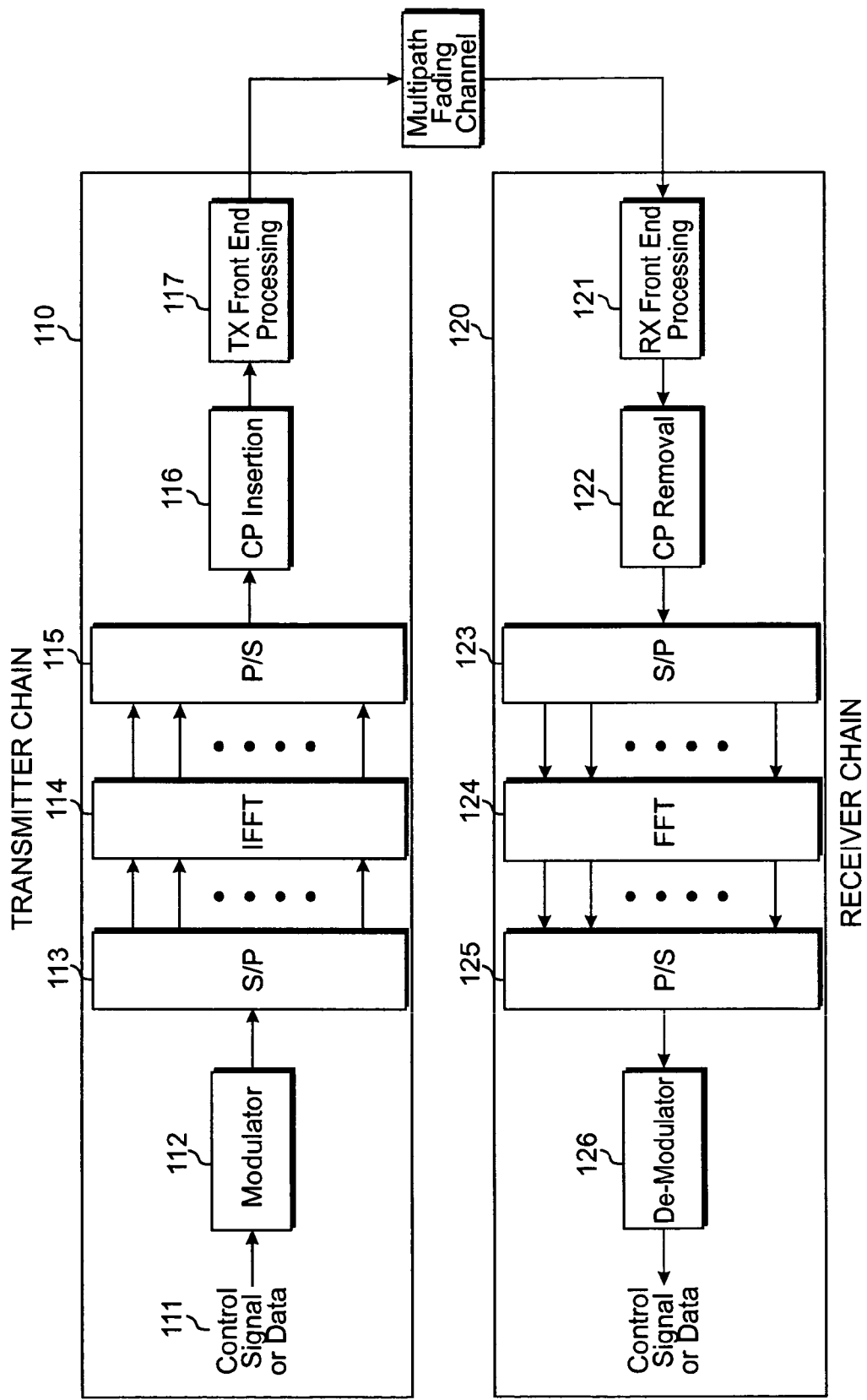
FIG. 1 is an illustration of an Orthogonal Frequency Division Multiplexing (OFDM) transceiver chain suitable for the practice of the principles of the present inventions.

FIG. 1 illustrates an Orthogonal Frequency Division Multiplexing (OFDM) transceiver chain. In a communication system using OFDM technology, at transmitter chain 110, control signals or data 111 is modulated by modulator 112 and is serial-to-parallel converted by Serial/Parallel (S/P) converter 113. Inverse Fast Fourier Transform (IFFT) unit 114 is used to transfer the signal from frequency domain to time domain. Cyclic prefix (CP) or zero prefix (ZP) is added to each OFDM symbol by CP insertion unit 116 to avoid or mitigate the impact due to multipath fading. Consequently, the signal is transmitted by transmitter (Tx) front end processing unit 117, such as an antenna (not shown), or alternatively, by fixed wire or cable. At receiver chain 120, assuming perfect time and frequency synchronization are achieved, the signal received by receiver (Rx) front end processing unit 121 is processed by CP removal unit 122. Fast Fourier Transform (FFT) unit 124 transfers the received signal from time domain to frequency domain for further processing.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

The scheme of diversity is widely used to combat the effect of fast fading by providing a receiver with multiple faded replicas of the same information-bearing signal. An example of open-loop transmission diversity scheme is the Alamouti 2×1 space-time block code (STBC) transmission diversity scheme as illustrated in FIG. 2. In this approach, during any symbol period, i.e., time period, a transmitter transmits two data symbols via two transmission antennas to a receiver. As shown in FIG. 2, during the first symbol interval t1, symbols $S_1$ and $S_2$ are respectively transmitted via antennas ANT 1 and ANT 2. During the next symbol period t2, symbols $-S^*_2$ and $S^*_1$ are respectively transmitted via antennas ANT 1 and ANT 2, where x* represents complex conjugate of x. After receiving the signals, the receiver performs a plurality of processes to recover original symbols $S_1$ and $S_2$. Note that the instantaneous channel gains g1 and g2 for ANT 1 and ANT 2, respectively, are required for processing at the receiver. Therefore, the transmitter needs to transmit separate pilot symbols via both the antennas ANT 1 and ANT 2 for channel gain estimation at the receiver. The diversity gain achieved by Alamouti coding is the same as that achieved in Maximum Ratio Combining (MRC).

The 2×1 Alamouti scheme can also be implemented in a space-frequency block code (SFBC) transmission diversity scheme as illustrated in FIG. 3. As shown in FIG. 3, symbols $S_1$ and $S_2$ are respectively transmitted to a receiver via antennas ANT 1 and ANT 2 on a first subcarrier having frequency f1 in an Orthogonal Frequency Division Multiplexing (OFDM) system, symbols $-S^*_2$ and $S^*_1$ are respectively transmitted via antennas ANT 1 and ANT 2 on a second subcarrier having frequency f2. Therefore a matrix of transmitted symbols from antennas ANT 1 and ANT 2 can be written as:

$$\begin{bmatrix} T_{11} & T_{12} \\ T_{21} & T_{22} \end{bmatrix} = \begin{bmatrix} S_1 & -S^*_2 \\ S_2 & S^*_1 \end{bmatrix}, \quad (2)$$

The received signal at the receiver on subcarrier having frequency f1 is $r_1$, and the received signal at the receiver on subcarrier having frequency f2 is $r_2$. $r_1$ and $r_2$ can be written as:

$$r_1 = h_1 s_1 + h_2 s_2 + n_1$$

$$r_2 = -h_1 s^*_2 + h_2 s^*_1 + n_2' \quad (3)$$

where $h_1$ and $h_2$ are channel gains from ANT 1 and ANT 2 respectively. We also assume that the channel from a given antennas does not change between subcarrier having frequency $f_1$ and subcarrier having frequency $f_2$. The receiver performs equalization on the received signals and combines the two received signals ($r_1$ and $r_2$) to recover the symbols $S_1$ and $S_2$. The recovered symbols $\hat{S}_1$ and $\hat{S}_2$ can be written as:

$$\hat{s}_1 = h_1^* r_1 + h_2 r_2^* \quad (4)$$
$$= h_1^*(h_1 s_1 + h_2 s_2 + n_1) + h_2(-h_1 s_2^* + h_2 s_1^* + n_2)^*$$
$$= (|h_1|^2 + |h_2|^2) s_1 + h_1^* n_1 + h_2 n_2^*$$

$$\hat{s}_2 = h_2^* r_1 + h_1 r_2^*$$
$$= h_2^*(h_1 s_1 + h_2 s_2 + n_1) + h_1(-h_1 s_2^* + h_2 s_1^* + n_2)^*$$
$$= (|h_1|^2 + |h_2|^2) s_2 + h_2^* n_1 + h_1 n_2^*$$

It can be seen that both of the transmitted symbols $\hat{S}_1$ and $\hat{S}_2$ achieve full spatial diversity, that is, the each of the transmitted symbols $\hat{S}_1$ and $\hat{S}_2$ completely removes an interference from the other one.

An alternative mapping for two transmission antennas SFBC scheme is shown in FIG. 4. A matrix of transmitted symbols from antennas ANT 1 and ANT 2 can be written as:

$$\begin{bmatrix} T_{11} & T_{12} \\ T_{21} & T_{22} \end{bmatrix} = \begin{bmatrix} S_1 & S_2 \\ -S_2^* & S_1^* \end{bmatrix}, \quad (5)$$

The transmit matrix in Equation (5) for the scheme in FIG. 4 is a transpose of the transmit matrix in Equation (2) for the scheme shown in FIG. 3.

For the case of four transmission antennas, orthogonal full-diversity block codes are not available. An example of quasi-orthogonal block code, also known as ABBA code, is given below.

$$\begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} A & B \\ B & A \end{bmatrix} = \begin{bmatrix} S_1 & -S_2^* & S_3 & -S_4^* \\ S_2 & S_1^* & S_4 & S_3^* \\ S_3 & -S_4^* & S_1 & -S_2^* \\ S_4 & S_3^* & S_2 & S_1^* \end{bmatrix} \quad (6)$$

where $T_{ij}$ represents symbol transmitted on the ith antenna and the jth subcarrier or jth time slot (i=1, 2, 3, 4, j=1, 2, 3, 4) for the case of 4-Tx antennas. A and B are block codes given as below.

$$A = \frac{1}{\sqrt{2}} \begin{bmatrix} S_1 & -S_2^* \\ S_2 & S_1^* \end{bmatrix} \quad (7)$$

$$B = \frac{1}{\sqrt{2}} \begin{bmatrix} S_3 & -S_4^* \\ S_4 & S_3^* \end{bmatrix}$$

The problem with quasi-orthogonal block codes is that the loss of orthogonality may result in inter-symbol interference and hence may degrade system performance and throughput.

Other proposals found in the art for four transmission antennas transmit diversity combines Frequency Switched Transmit Diversity (FSTD) or Time Switched Transmit Diversity (TSTD) with block codes. In case of combined SFBC+FSTD scheme or STBC+TSTD scheme, the matrix of the transmitted symbols from the four transmission antennas may be given as:

$$\begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_1 & -S_2^* & 0 & 0 \\ S_2 & S_1^* & 0 & 0 \\ 0 & 0 & S_3 & -S_4^* \\ 0 & 0 & S_4 & S_3^* \end{bmatrix}. \quad (8)$$

An equivalent representation of the above SFBC+FSTD transmit signal given in equation (1) exists in the following form. Let the transmit signal vector $y(i)=[y^{(0)}(i)\ y^{(1)}(i)\ y^{(2)}(i)\ y^{(3)}(i)]^T$ denote the transmit signal vector on four transmit antennas for the ith subcarrier. The transmit signal generated from the SFBC+FSTD scheme in (1) can be equivalently written as follows, assuming the transmit signal is mapped to the four consecutive subcarriers $4i$, $4i+1$, $4i+1$, $4i+3$:

$$\begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} = \begin{bmatrix} 1 & 0 & 0 & 0 & j & 0 & 0 & 0 \\ 0 & -1 & 0 & 0 & 0 & j & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 1 & 0 & 0 & 0 & j & 0 & 0 \\ 1 & 0 & 0 & 0 & -j & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & -1 & 0 & 0 & 0 & j \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & j \\ 0 & 0 & 1 & 0 & 0 & 0 & -j & 0 \end{bmatrix} \times \begin{bmatrix} \text{Re}(S_1(i)) \\ \text{Re}(S_2(i)) \\ \text{Re}(S_3(i)) \\ \text{Re}(S_4(i)) \\ \text{Im}(S_1(i)) \\ \text{Im}(S_2(i)) \\ \text{Im}(S_3(i)) \\ \text{Im}(S_4(i)) \end{bmatrix} \quad (9)$$

where each of $S_1(i), S_2(i), S_3(i), S_4(i)$ is a functions of index $i$.

The problem with combined SFBC+FSTD scheme and STBC+TSTD schemes is that only a fraction of the total transmission antennas and hence power amplifier (PA) capability is used for transmission in a given frequency or time resource. This is indicated by '0' elements in the SFBC+FSTD and STBC+TSTD matrix given above. When the transmit power on the non-zero elements in the matrix is increased, bursty interference is generated to the neighboring cells degrading system performance.

Figure 5:
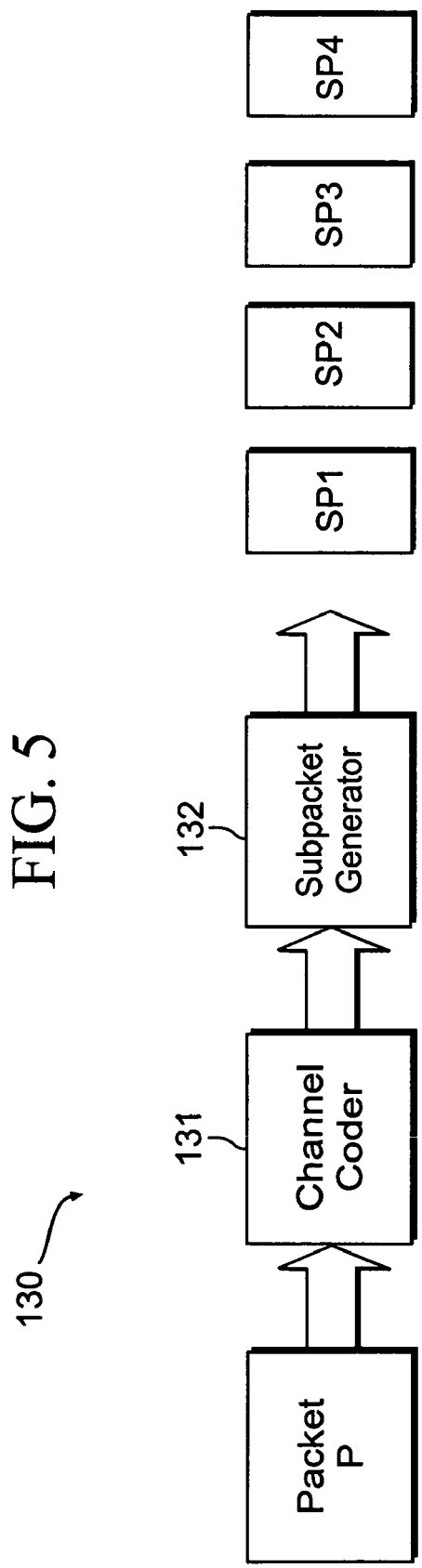
FIG. 5 is an illustration of a transmitter in Hybrid Repeat reQuest scheme.

Hybrid Automatic Repeat request (ARQ) is a retransmission scheme whereby a transmitter sends redundant coded information (i.e., subpackets) in small increments. As shown in FIG. 5, in transmitter 130, an information packet P is first input into channel coder 131 to perform channel coding. The resulted coded bit stream is input into subpacket generator 132 to break into smaller units, i.e., subpackets SP1, SP2, SP3 and SP4. The hybrid ARQ retransmissions can either contain redundant symbols or coded bits which are different than the previous transmission(s) or copies of the same symbols or coded bits. The scheme which retransmits copies of the same information is referred to as chase combining. In case of Chase combining, the subpackets SP1, SP2, SP3 and SP4 as shown in FIG. 4 are all identical. The scheme where retransmitted symbols or coded bits are different than the previous transmission is generally referred to as an incremental redundancy scheme.

Figure 6:
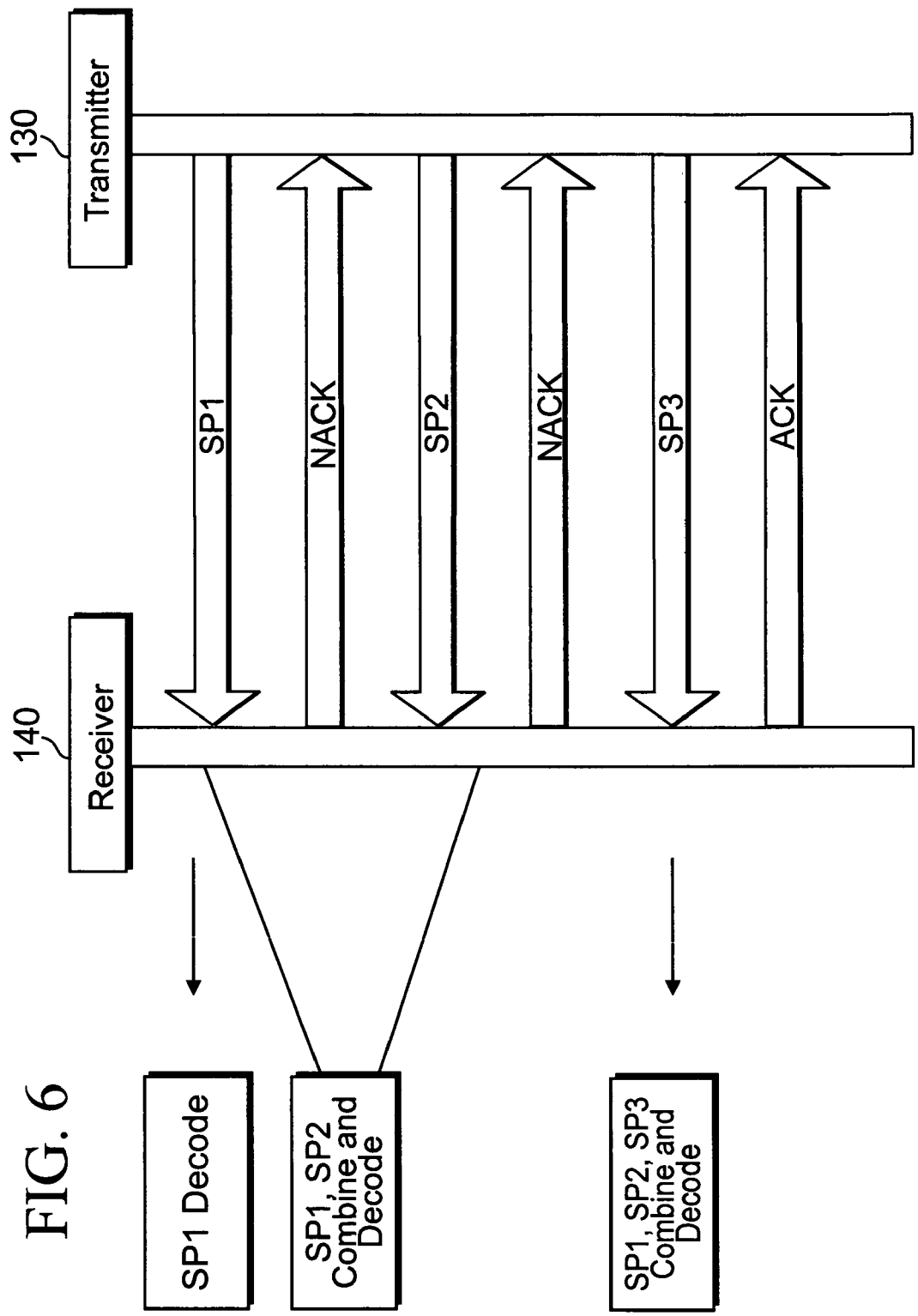
FIG. 6 is an illustration of Hybrid Repeat reQuest scheme.

An example of Hybrid ARQ protocol is shown in FIG. 6. After receiving the first subpacket SP1 from transmitter 130, receiver 140 tries to decode the received information packet. In case of unsuccessful decoding, receiver 140 stores SP1 and sends a Negative. Acknowledgement (NACK) signal to transmitter 130. After receiving the NACK signal, transmitter 130 transmits the second subpacket SP2. After receiving the second subpacket SP2, receiver 140 combines SP2 with the previously received subpacket SP1, and tries to jointly decode the combined information packet. At any point, if the information packet is successfully decoded by indication of a successful Cyclic Redundancy Check (CRC) check, for example, receiver 140 sends an ACK signal to transmitter 130. In the example of FIG. 6, the information packet is successfully decoded after receiving and combining three subpackets, SP1, SP2 and SP3. The ARQ protocol shown in FIG. 6 is generally referred to as stop-and-wait protocol because the transmitter waits for the ACK/NACK signal before sending the next subpacket. After receiving the ACK signal, the transmitter can move on to transmit a new information packet to the same or a different user.

Figure 7:
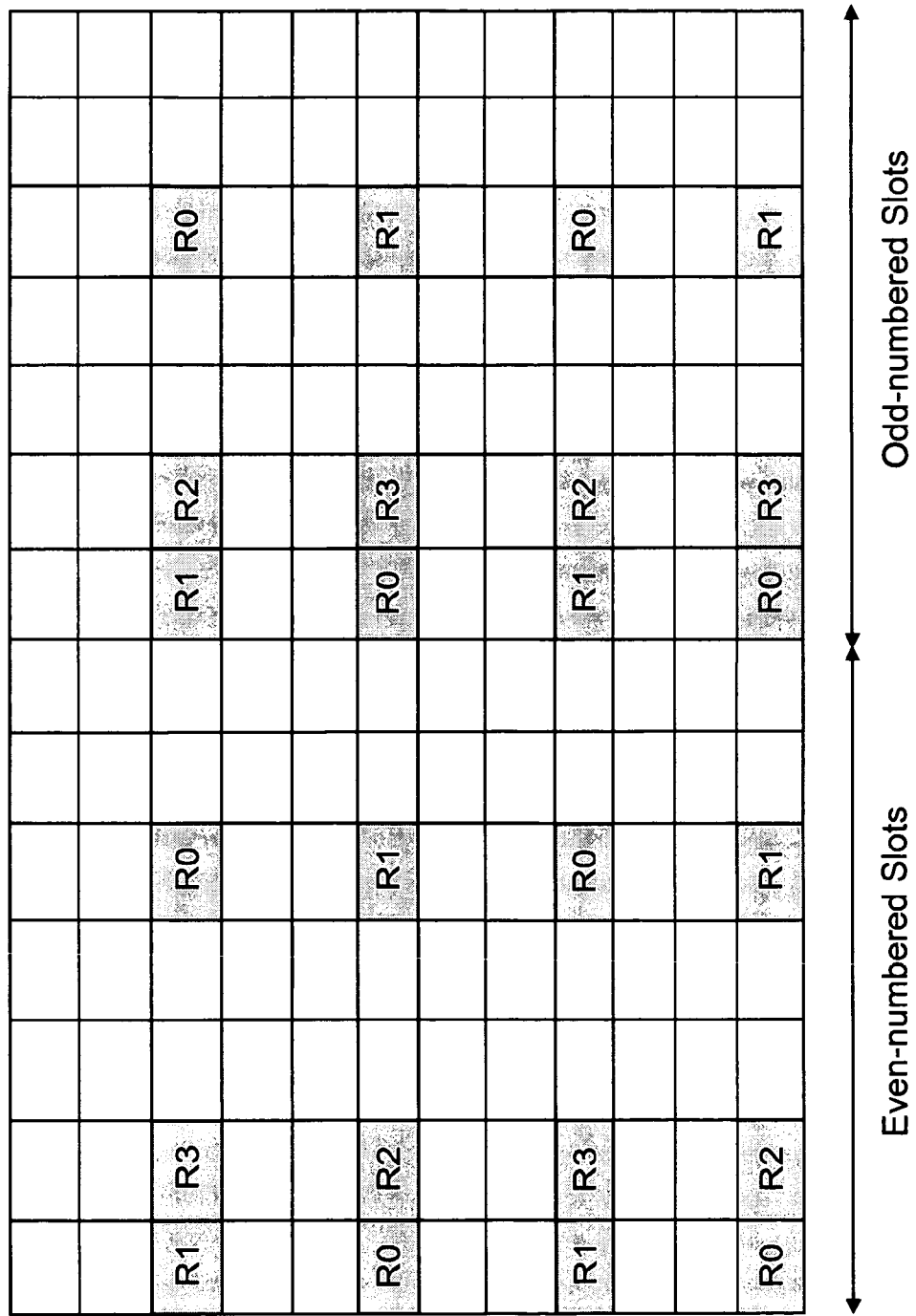
FIG. 7 is an illustration of mapping of downlink reference signals in a contemporary $3^{rd}$ Generation Partnership Project Long Term Evolution system.

The downlink reference signals mapping for four transmission antennas in the 3GPP LTE (3$^{rd}$ Generation Partnership Project Long Term Evolution) system is shown in FIG. 7. The notation $R_p$ is used to denote a resource element used for reference signal transmission on antenna port p. It can be noted that density on antenna ports 2 and 3 is half the density on antenna ports 0 and 1. This leads to weaker channel estimates on antenna ports 2 and 3 relative to channel estimates on antenna ports 0 and 1.

In the current invention we describe an open-loop transmission diversity scheme where Alamouti block code is spread with an orthogonal function to provide diversity for transmissions via more than two transmission antennas. We will describe the invention assuming a Fourier matrix. It should be noted that the principles of the current invention can be easily extended and applied to the cases of other orthogonal functions such as Hadamard function or Zadoff-Chu (ZC) sequences.

A Fourier matrix is a N×N square matrix with entries given by:

$$P_N = e^{j2\pi mn/N} \quad m, n = 0, 1, \ldots (N-1) \tag{10}$$

For example, a 2×2 Fourier matrix can be expressed as:

$$P_2 = \begin{bmatrix} 1 & 1 \\ 1 & e^{j\pi} \end{bmatrix} = \begin{bmatrix} 1 & 1 \\ 1 & -1 \end{bmatrix} \tag{11}$$

Similarly, a 4×4 Fourier matrix can be expressed as:

$$P_4 = \begin{bmatrix} 1 & 1 & 1 & 1 \\ 1 & e^{j\pi/2} & e^{j\pi} & e^{j3\pi/2} \\ 1 & e^{j\pi} & e^{j2\pi} & e^{j3\pi} \\ 1 & e^{j3\pi/2} & e^{j3\pi} & e^{j9\pi/2} \end{bmatrix} = \begin{bmatrix} 1 & 1 & 1 & 1 \\ 1 & j & -1 & -j \\ 1 & -1 & 1 & -1 \\ 1 & -j & -1 & j \end{bmatrix} \tag{12}$$

Multiple Fourier matrices can be defined by introducing a shift parameter (g/G) in the Fourier matrix. The entry of the multiple Fourier matrices is given by:

$$P_{mn} = e^{j2\pi \frac{m}{N}(n+\frac{g}{G})} \quad m, n = 0, 1, \ldots (N-1) \tag{13}$$

A set of four 2×2 Fourier matrices can be defined by taking G=4, and g=0, 1, 2 and 3 are written as:

$$P_2^0 = \begin{bmatrix} 1 & 1 \\ 1 & -1 \end{bmatrix} \tag{14}$$

$$P_2^1 = \begin{bmatrix} 1 & 1 \\ e^{j\pi/4} & -e^{j\pi/4} \end{bmatrix} \tag{15}$$

$$P_2^2 = \begin{bmatrix} 1 & 1 \\ e^{j\pi/2} & -e^{j\pi/2} \end{bmatrix} \tag{16}$$

$$P_2^3 = \begin{bmatrix} 1 & 1 \\ e^{j3\pi/4} & -e^{j3\pi/4} \end{bmatrix} \tag{17}$$

Note that in addition to the set of four Fourier matrices listed above, we can also apply row or column permuted versions of these set of Fourier matrices. For example, the row and column permutations of the matrix $P_2^0$ is given by:

$$P_2^5 = \frac{1}{\sqrt{2}}\begin{bmatrix} 1 & 1 \\ -1 & 1 \end{bmatrix} \quad P_2^6 = \frac{1}{\sqrt{2}}\begin{bmatrix} 1 & -1 \\ 1 & 1 \end{bmatrix} \tag{18}$$

For each Fourier matrix, there are two permuted versions. So the total number of the spread matrix P is 12.

In a k-th Zadoff-Chu sequence, an n-th entry $c_k(n)$ of the k-th Zadoff-Chu sequence can be expressed as:

$$c_k(n) = e^{j2\pi k \frac{n(n+1)/2+qn}{L}} \text{ where } L \text{ is a positive odd integer} \tag{19}$$

$$c_k(n) = e^{j2\pi k \frac{n^2/2+qn}{L}} \text{ where } L \text{ is a positive even integer}$$

where k is an integer which is relatively prime with L, and q is an integer.

A Hadamard matrix of order n is a solution to Hadamard's matrimum determinant problem. An equivalent definition of the Hadamard matrices is given by:

$$H_n H_n^T = n I_n \tag{20}$$

where In is an n×n identity matrix.

For example, a Hadamard matrix of order 4 can be expresses as:

$$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \tag{21}$$

In a first embodiment according to the principles of the present invention, we assume that four symbols $S_1$, $S_2$, $S_3$ and $S_4$ are transmitted on four subcarriers using four transmission antennas. Let us define matrix A and B as below.

$$A = \frac{1}{\sqrt{2}}\begin{bmatrix} S_1 & -S_2^* \\ S_2 & S_1^* \end{bmatrix} \quad (22)$$

$$B = \frac{1}{\sqrt{2}}\begin{bmatrix} S_3 & -S_4^* \\ S_4 & S_3^* \end{bmatrix}$$

It can be seen that each matrix A and B is an Alamouti code for the pair of symbols $S_1$ and $S_2$, and the pair of symbols $S_3$ and $S_4$, respectively. We construct a 2×2 matrix with A and B as its elements and perform an element-by-element multiplication with an expanded 2×2 Fourier matrix as below. Note that the operator .* formed by a period immediately followed by an asterisk denotes element-wise multiplication and ⊗ denotes kronecker product.

$$T_i = \frac{1}{\sqrt{2}}\begin{bmatrix} A & A \\ B & B \end{bmatrix} .* \left( P_2^i \otimes \begin{bmatrix} 1 & 1 \\ 1 & 1 \end{bmatrix} \right), \text{ for } i = 1, \ldots, 12. \quad (23)$$

For i=0 case, the resulting 4×4 matrix denoting discrete Fourier transform DFT-spread SFBC or DFT-spread STBC is given as below.

$$T_0 = \frac{1}{\sqrt{2}}\begin{bmatrix} A & A \\ B & B \end{bmatrix} .* \left( P_2^0 \otimes \begin{bmatrix} 1 & 1 \\ 1 & 1 \end{bmatrix} \right) \quad (24)$$

$$= \frac{1}{\sqrt{2}}\begin{bmatrix} A & A \\ B & B \end{bmatrix} .* \left( \frac{1}{\sqrt{2}}\begin{bmatrix} 1 & 1 \\ 1 & -1 \end{bmatrix} \otimes \begin{bmatrix} 1 & 1 \\ 1 & 1 \end{bmatrix} \right)$$

$$= \frac{1}{\sqrt{4}}\begin{bmatrix} S_1 & -S_2^* & S_1 & -S_2^* \\ S_2 & S_1^* & S_2 & S_1^* \\ S_3 & -S_4^* & -S_3 & S_4^* \\ S_4 & S_3^* & -S_4 & -S_3^* \end{bmatrix}$$

Similarly, for i=2 case, the Fourier matrix $P_2^2$ can be used to generate the following 4×4 transmission matrix.

$$T_2 = \frac{1}{\sqrt{2}}\begin{bmatrix} A & A \\ B & B \end{bmatrix} .* \left( P_2^2 \otimes \begin{bmatrix} 1 & 1 \\ 1 & 1 \end{bmatrix} \right) \quad (25)$$

$$= \frac{1}{\sqrt{2}}\begin{bmatrix} A & A \\ B & B \end{bmatrix} .* \left( \frac{1}{\sqrt{2}}\begin{bmatrix} 1 & 1 \\ j & -j \end{bmatrix} \otimes \begin{bmatrix} 1 & 1 \\ 1 & 1 \end{bmatrix} \right)$$

$$= \frac{1}{\sqrt{4}}\begin{bmatrix} S_1 & -S_2^* & S_1 & -S_2^* \\ S_2 & S_1^* & S_2 & S_1^* \\ jS_3 & -jS_4^* & -jS_3 & jS_4^* \\ jS_4 & jS_3^* & -jS_4 & -jS_3^* \end{bmatrix}$$

For the case where the spreading matrix is a permuted version of the Fourier matrix, for example, for i=5, we have $$T_5 = \frac{1}{\sqrt{2}}\begin{bmatrix} A & A \\ B & B \end{bmatrix} .* \left( P_2^5 \otimes \begin{bmatrix} 1 & 1 \\ 1 & 1 \end{bmatrix} \right) \quad (26)$$

$$= \frac{1}{\sqrt{2}}\begin{bmatrix} A & A \\ B & B \end{bmatrix} .* \left( \frac{1}{\sqrt{2}}\begin{bmatrix} 1 & 1 \\ -1 & 1 \end{bmatrix} \otimes \begin{bmatrix} 1 & 1 \\ 1 & 1 \end{bmatrix} \right)$$

$$= \frac{1}{\sqrt{4}}\begin{bmatrix} S_1 & -S_2^* & S_1 & -S_2^* \\ S_2 & S_1^* & S_2 & S_1^* \\ -S_3 & S_4^* & S_3 & -S_4^* \\ -S_4 & -S_3^* & S_4 & S_3^* \end{bmatrix}$$

For a given matrix (for example matrix $T_0$), the element on row m, column n is denoted by $[T_0]_{m,n}$, and $[T_0]_{m,n}$ represents the symbol transmitted on the mth antenna and the nth subcarrier or nth time slot, m=1, 2, 3, 4 and n=1, 2, 3, 4 for the case of four transmission antennas. FIG. 8 is an illustration of the transmission diversity scheme for four transmission antennas and four time slots according to Equation (25) in the first embodiment of the principles of the present invention.

It can be noted that the same principle can be applied to the case where the 4×4 matrix transmission is over a mix of subcarriers and time slots. For example, the four elements (index n) can be constructed with 2 subcarriers and 2 time slots.

In a second embodiment according to the principles of the present invention, we exchange the second row and the third row of $T_i$, thus resulting in a new SFBC matrix called $T_{i,r}$. $T_{i,r}$ is useful for evening out pilot-density disparity inherent in the reference signal structure of the LTE system. For example, $T_{0,r}$ is given by the following.

$$T_{0,r} = \frac{1}{\sqrt{4}}\begin{bmatrix} S_1 & -S_2^* & S_1 & -S_2^* \\ S_3 & -S_4^* & -S_3 & S_4^* \\ S_2 & S_1^* & S_2 & S_1^* \\ S_4 & S_3^* & -S_4 & -S_3^* \end{bmatrix} \quad (27)$$

FIG. 9 is an illustration of the transmission diversity scheme for four transmission antennas and four time slots according to Equation (27) in the second embodiment of the principles of the present invention.

In a third embodiment according to the principles of the present invention, we propose to exchange the second and the third row of the SFBC-FSTD matrix as shown in Equation (8), thus resulting in new SFBC matrix. By this operation, symbols $S_1$ and $S_2$ are transmitted over antennas ports 0 and 2 while symbols $S_3$ and $S_4$ are transmitted over antenna ports 1 and 3 as given by the transmit matrix below. Again, this is useful for evening out pilot-density disparity inherent in the reference signal structure of the LTE system.

$$\begin{bmatrix} S_1 & -S_2^* & 0 & 0 \\ 0 & 0 & S_3 & -S_4^* \\ S_2 & S_1^* & 0 & 0 \\ 0 & 0 & S_4 & S_3^* \end{bmatrix} \quad (28)$$

FIG. 10 is an illustration of the transmission diversity scheme for four transmission antennas and four time slots according to Equation (28) as in the third embodiment of the principles of the present invention.

In a fourth embodiment according to the principles of the current invention, the matrices A and B are permuted for Hybrid ARQ retransmissions or repeated symbols as below:

$$T_{2,h} = \frac{1}{\sqrt{2}} \begin{bmatrix} B & B \\ A & A \end{bmatrix} \cdot * \left( \frac{1}{\sqrt{2}} \begin{bmatrix} 1 & 1 \\ j & -j \end{bmatrix} \otimes \begin{bmatrix} 1 & 1 \\ 1 & 1 \end{bmatrix} \right) \quad (29)$$

$$= \frac{1}{\sqrt{4}} \begin{bmatrix} S_3 & -S_4^* & S_3 & -S_4^* \\ S_4 & S_3^* & S_4 & S_3^* \\ jS_1 & -jS_2^* & -jS_1 & jS_2^* \\ jS_2 & jS_1^* & -jS_2 & -jS_1^* \end{bmatrix}$$

Figure 11:
FIG. 11 is an illustration of a transmission diversity scheme for four transmission antennas according to a fourth embodiment of the principles of the present invention.

This allows for achieving full diversity when the symbols are repeated either due to lower coding rate or Hybrid ARQ retransmissions as shown in FIG. 11, where $T_2$ is used for the first transmission at the first time slot (slot 1) and $T_{2,h}$ is used for the second transmission at the fifth time slot (slot 5). Similarly, any pairs of $T_i, T_{i,h}$ for i=0, . . . , 3 can be used for HARQ purpose. This is because symbols ($S_1$, $S_2$) are transmitted via antenna 1 and 2 for the first transmission and antennas 3 and 4 when repeated for the second transmission. Similarly, symbols ($S_3$, $S_4$) are transmitted via antenna 3 and 4 for the first transmission and antennas 1 and 2 when repeated for the second transmission.

In a fifth embodiment according to the principles of the current invention, we define a set of totally six row-permuted matrices for each matrix $T_i$ defined as above, for i=0, . . . , 3. Note other row-permutation are possible but is equivalent to these six included here. These six permuted matrices are denoted as $T_i^A$, $T_i^B$, $T_i^C$, $T_i^D$, $T_i^E$, $T_i^F$ and are defined as (for i=0, . . . , 3)

$$T_i^A = \begin{bmatrix} 1 & 0 & 0 & 0 \\ 0 & 1 & 0 & 0 \\ 0 & 0 & 1 & 0 \\ 0 & 0 & 0 & 1 \end{bmatrix} T_i, \quad (30)$$

$$T_i^B = \begin{bmatrix} 1 & 0 & 0 & 0 \\ 0 & 0 & 1 & 0 \\ 0 & 1 & 0 & 0 \\ 0 & 0 & 0 & 1 \end{bmatrix} T_i,$$

$$T_i^C = \begin{bmatrix} 1 & 0 & 0 & 0 \\ 0 & 0 & 0 & 1 \\ 0 & 1 & 0 & 0 \\ 0 & 0 & 1 & 0 \end{bmatrix} T_i$$

$$T_i^D = \begin{bmatrix} 0 & 0 & 1 & 0 \\ 0 & 0 & 0 & 1 \\ 1 & 0 & 0 & 0 \\ 0 & 1 & 0 & 0 \end{bmatrix} T_i,$$

$$T_i^E = \begin{bmatrix} 0 & 1 & 0 & 0 \\ 0 & 0 & 0 & 1 \\ 1 & 0 & 0 & 0 \\ 0 & 0 & 1 & 0 \end{bmatrix} T_i,$$

$$T_i^F = \begin{bmatrix} 0 & 1 & 0 & 0 \\ 0 & 0 & 1 & 0 \\ 1 & 0 & 0 & 0 \\ 0 & 0 & 0 & 1 \end{bmatrix} T_i$$

For example, the six row-permuted versions of $T_0$ are given by $$T_0^A = \frac{1}{\sqrt{4}} \begin{bmatrix} S_1 & -S_2^* & S_1 & -S_2^* \\ S_2 & S_1^* & S_2 & S_1^* \\ S_3 & -S_4^* & -S_3 & S_4^* \\ S_4 & S_3^* & -S_4 & -S_3^* \end{bmatrix}, \quad (31)$$

$$T_0^B = \frac{1}{\sqrt{4}} \begin{bmatrix} S_1 & -S_2^* & S_1 & -S_2^* \\ S_3 & -S_4^* & -S_3 & S_4^* \\ S_2 & S_1^* & S_2 & S_1^* \\ S_4 & S_3^* & -S_4 & -S_3^* \end{bmatrix},$$

$$T_0^C = \frac{1}{\sqrt{4}} \begin{bmatrix} S_1 & -S_2^* & S_1 & -S_2^* \\ S_3 & -S_4^* & -S_3 & S_4^* \\ S_4 & S_3^* & -S_4 & -S_3^* \\ S_2 & S_1^* & S_2 & S_1^* \end{bmatrix},$$

$$T_0^D = \frac{1}{\sqrt{4}} \begin{bmatrix} S_3 & -S_4^* & -S_3 & S_4^* \\ S_4 & S_3^* & -S_4 & -S_3^* \\ S_1 & -S_2^* & S_1 & -S_2^* \\ S_2 & S_1^* & S_2 & S_1^* \end{bmatrix},$$

$$T_0^E = \frac{1}{\sqrt{4}} \begin{bmatrix} S_2 & S_1^* & S_2 & S_1^* \\ S_4 & S_3^* & -S_4 & -S_3^* \\ S_1 & -S_2^* & S_1 & -S_2^* \\ S_3 & -S_4^* & -S_3 & S_4^* \end{bmatrix},$$

$$T_0^F = \frac{1}{\sqrt{4}} \begin{bmatrix} S_4 & S_3^* & -S_4 & -S_3^* \\ S_2 & S_1^* & S_2 & S_1^* \\ S_1 & -S_2^* & S_1 & -S_2^* \\ S_3 & -S_4^* & -S_3 & S_4^* \end{bmatrix}$$

Figure 12:
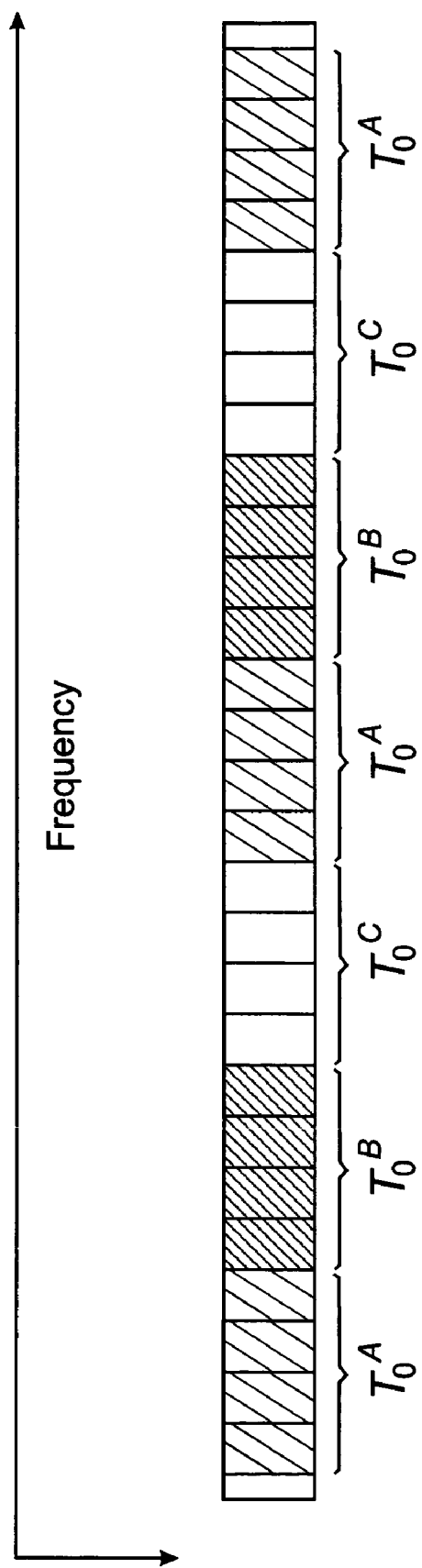
FIG. 12 is an illustration of a transmission diversity scheme for four transmission antennas according to a fifth embodiment of the principles of the present invention.

While the transmitter maps the modulated symbols to the physical time-frequency OFDM transmission resource, the transmitter selects a subset of K permuted matrices from the six permuted matrices for a given number i. Afterward, the transmitter divides the OFDM transmission resource into K parts in frequency domain, each uses a selected permuted matrix from the subset of K matrices. One example is to let i=0, K=3, and let the three permuted matrices be $T_0^A$, $T_0^B$, $T_0^C$. These three matrices will applied along the frequency dimension, in a pattern that repeats every 12 sub-carriers, as shown in FIG. 12.

Figure 13:
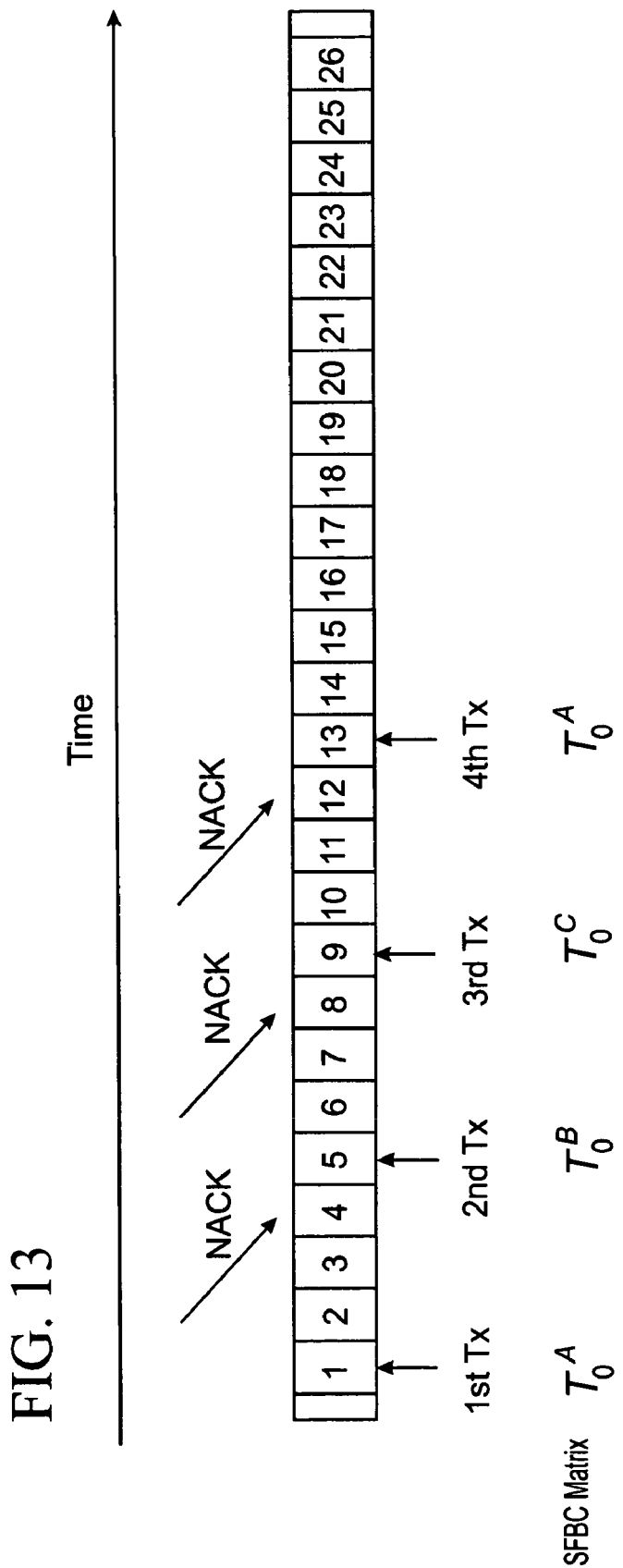
FIG. 13 is an illustration of a transmission diversity scheme for four transmission antennas according to a sixth embodiment of the principles of the present invention.

In a sixth embodiment according to the principles of the current invention, the base station selects a subset of K permuted matrices for the purpose of HARQ. Furthermore, the base station applied different permuted matrices within this subset on different retransmissions of the packet, as illustrated in FIG. 13, where a subset of three (K=3) matrices are chosen for HARQ retransmissions. Specifically, at time slot 1, the transmitter transmits four modulated symbols by using $T_0^A$ via four subcarriers. In response to a NACK signal, the transmitter transmit the same four modulated symbols by using $T_0^B$ via four subcarriers in time slot 2. Again, in response to another NACK signal, the transmitter transmits the same four modulated symbols by using $T_0^C$ via four subcarriers in time slot 3. Noteworthy, this approach of applying permuted SFBC matrices on retransmissions apply to both Chase Combining and incremental redundancy.

In a seventh embodiment according to the principles of the current invention, the application of permuted matrices in frequency dimension, and the application of the permuted matrices in time dimension over several HARQ retransmissions, are combined. For example, row-permuted matrices $T_0^A$, $T_0^B$ and $T_0^C$ in frequency dimension may be used for different sub-carriers during each retransmission. Alternatively, in a first time slot, row-permuted matrices $T_0^A$, $T_0^B$ and $T_0^C$ in frequency dimension are used for different sub-carriers; in a second time slot, row-permuted matrices $T_0^D$, $T_0^E$ and $T_0^F$ are used for the corresponding sub-carriers.

Figure 14:
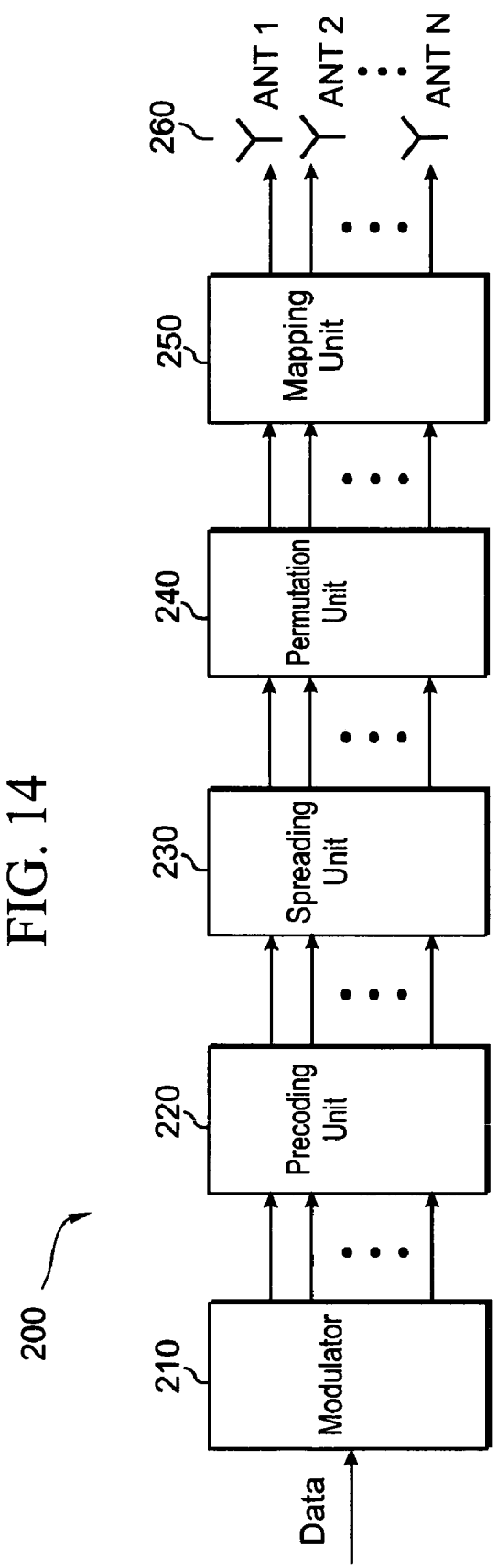
FIG. 14 is an illustration of a transmitter constructed as an exemplary embodiment according to the principles of the present invention.

FIG. 14 is an illustration of a transmitter constructed as an exemplary embodiment according to the principles of the present invention. Transmitter 200 is constructed with a modulator 210, a precoding unit 220, a spreading unit 230, a permutation unit 240, a mapping unit 250 and a plurality of antennas 260. Modulator 210 modulates data to be transmitted into a plurality of modulated symbols. Precoding unit 220 encodes each subset of modulated symbols from among said plurality of symbols in accordance with a transmission diversity scheme to result in a plurality of N by N matrices. Here, each N by N matrix corresponds to each subset of N modulated symbols. Spreading unit 230 orthogonally spreads the plurality of N by N matrices to generate an output matrix. Permutation unit 240 generates several row-permuted matrices based upon the output matrix. Mapping unit 250 maps the symbols in the row-permuted matrices into a plurality of resource elements. The symbols in the row-permuted matrices is transmitted through the plurality of antennas 260 by using either a space time transmission diversity scheme, a space frequency transmission diversity scheme, or a combination of a space time transmission diversity scheme and a space frequency transmission diversity scheme.

What is claimed is:

1. A method for data transmission, the method comprising:
    modulating data to be transmitted into a plurality of modulated symbols;
    dividing the plurality of modulated symbols into a plurality of subsets of modulated symbols, with each subset having N modulated symbols, and N being an integer no smaller than 2;
    encoding each subset of modulated symbols in accordance with a transmission diversity scheme to produce a plurality of N by N matrices, with each N by N matrix corresponding to each subset of modulated symbols;
    generating a first M by M code matrix comprising the plurality of N by N matrices, with M=N×X and X is the number of the plurality of N by N matrices;
    orthogonally spreading the first M by M code matrix to generate a first output matrix;
    transmitting the symbols in the first output matrix via a plurality of antennas in a first time slot;
    generating a second M by M code matrix by exchanging at least one selected pair of rows in the first M by M code matrix;
    orthogonally spreading the second M by M code matrix to generate a second output matrix; and
    transmitting the symbols in the second output matrix via the plurality of antennas in a second time slot.

2. The method of claim 1, with the transmission diversity scheme being an Alamouti diversity scheme, and each of the N by N matrices being established by:

$$A = \frac{1}{\sqrt{2}} \begin{bmatrix} S_1 & S_2 \\ -S_2^* & S_1^* \end{bmatrix}$$

where N=2, and $S_1$ and $S_2$ are one pair of the modulated symbols.

3. The method of claim 1, with the transmission diversity scheme being an Alamouti diversity scheme, and each of the N by N matrices being established by:

$$A = \frac{1}{\sqrt{2}} \begin{bmatrix} S_1 & -S_2^* \\ S_2 & S_1^* \end{bmatrix}$$

where N=2, and $S_1$ and $S_2$ are one pair of the modulated symbols.

4. The method of claim 1, with the first M by M code matrix C being established by:

$$C = \begin{bmatrix} A_1 & A_1 & \cdots & A_1 \\ A_2 & A_2 & \cdots & A_2 \\ \vdots & \vdots & \ddots & \vdots \\ A_x & A_x & \cdots & A_x \end{bmatrix}$$

where $A_1$ through $A_x$ are the plurality of N by N matrices.

5. The method of claim 1, with the orthogonal spreading of the plurality of N by N matrices being performed according to a Fourier matrix, and each element of the Fourier matrix being established by:

$$P_{mn} = e^{j2\pi \frac{m}{N}\left(n + \frac{g}{G}\right)},$$

where m, n=0, 1, ... (N−1), G=N×N, m is the row number of the matrix, n is the column number of the matrix, and g is selected to be any number between 0 and G−1.

6. The method of claim 1, with the orthogonal spreading of the plurality of N by N matrices being performed according to a Zadoff-Chu sequence, and an n-th entry $c_k(n)$ of a k-th Zadoff-Chu sequence being established by:

$$c_k(n) = e^{j2\pi k \frac{n(n+1)/2 + qn}{L}} \text{ where } L \text{ is a positive odd integer}$$

$$c_k(n) = e^{j2\pi k \frac{n^2/2 + qn}{L}} \text{ where } L \text{ is a positive even integer}$$

where k is an integer which is relatively prime with L, and q is an integer.

7. The method of claim 1, with the orthogonal spreading of the plurality of N by N matrices being performed according to a Hadamard matrix, and a Hadamard matrix of order n being established by:

$$H_n H_n^T = n I_n \quad (20)$$

where $I_n$ is an n×n identity matrix.

8. The method of claim 1, with the first output matrix being generated by:
    generating an M by M spreading matrix which is a Kronecker product of an N by N orthogonally spreading matrix and an X by X matrix with all elements being 1; and
    orthogonally spreading the first M by M code matrix by an element-wise multiplication of the M by M code matrix and the M by M spreading matrix.

9. The method of claim 1, further comprising:
    exchanging a selected pair of rows within the first output matrix before transmitting the symbols in the first output matrix; and exchanging a selected pair of rows within the second output matrix before transmitting the symbols in the first output matrix.

10. The method of claim 1, further comprising:
exchanging a selected pair of columns within the first output matrix before transmitting the symbols in the first output matrix; and
exchanging a selected pair of columns within the second output matrix before transmitting the symbols in the first output matrix.

11. The method of claim 1, with the symbols in the second output matrix being transmitted in response to a NACK signal received from a receiver.

12. A method for data transmission, the method comprising
modulating data to be transmitted into a plurality of modulated symbols;
dividing the plurality of modulated symbols into a plurality of sets of M modulated symbols;
for each set of M modulated symbols, generating an output matrix by:
dividing the M modulated symbols into a plurality of subsets of N modulated symbols, with M=N×X, and X is the quantity of the subsets of N modulated symbols;
encoding each subset of N modulated symbols in accordance with a transmission diversity scheme to produce a plurality of N by N matrices, with each N by N matrix corresponding to each subset of modulated symbols;
generating an M by M code matrix comprising the plurality of N by N matrices; and
orthogonally spreading the M by M code matrix to generate the output matrix;
selecting a set of K output matrices from among the generated output matrices;
generating a set of K row-permuted matrixes based upon the corresponding output matrix within the set of K output matrices, with each row-permuted matrix being generated by using a selected row-permutation scheme, and the row permutation schemes used by different matrices being different;
segregating an available transmission resource into a plurality of frequency sub-carriers;
dividing the plurality of sub-carriers into a plurality of sets of M continuous sub-carriers;
repeatedly mapping the selected set of K row-permuted matrices into the plurality of sets of M sub-carriers, with each set of M sub-carriers corresponding to a row-permuted matrix; and
transmitting the symbols in the selected row-permuted matrices using the corresponding sub-carriers via a plurality of antennas.

13. The method of claim 12, with the transmission diversity scheme being an Alamouti diversity scheme.

14. The method of claim 12, with the M by M code matrix C being established by:

$$C = \begin{bmatrix} A_1 & A_1 & \cdots & A_1 \\ A_2 & A_2 & \cdots & A_2 \\ \vdots & \vdots & \ddots & \vdots \\ A_x & A_x & \cdots & A_x \end{bmatrix}$$

where $A_1$ through $A_x$ are the plurality of N by N matrices.

15. The method of claim 12, with the output matrix being generated by:
generating an M by M spreading matrix which is a Kronecker product of an N by N orthogonally spreading matrix and an X by X matrix with all elements being 1; and
orthogonally spreading the M by M code matrix by an element-wise multiplication of the M by M code matrix and the M by M spreading matrix.

16. The method of claim 12, further comprising transmitting the symbols in the selected K row-permuted matrices using the corresponding sub-carriers via the plurality of antennas in a subsequent time slot.

17. A method for data transmission, the method comprising the steps of:
modulating data to be transmitted into a plurality of modulated symbols;
dividing the plurality of modulated symbols into a plurality of subsets of modulated symbols, with each subset having N modulated symbols, and N being an integer no smaller than 2;
encoding each subset of modulated symbols in accordance with a transmission diversity scheme to produce a plurality of N by N matrices, with each N by N matrix corresponding to each subset of modulated symbols;
generating a M by M code matrix C comprising the plurality of N by N matrices, with M=N×X and X is the number of the plurality of N by N matrices;
orthogonally spreading the M by M code matrix to generate an output matrix;
generating a set of row-permuted matrixes based upon the output matrix, each row-permuted matrix being generated by exchanging a selected pair of rows in the output matrix;
selecting a subset of K row-permuted matrices; and
transmitting the symbols in the selected subset of row-permuted matrices in different time slots.

18. The method of claim 17, with the transmission diversity scheme being an Alamouti diversity scheme.

19. The method of claim 17, with the M by M code matrix C being established by:

$$C = \begin{bmatrix} A_1 & A_1 & \cdots & A_1 \\ A_2 & A_2 & \cdots & A_2 \\ \vdots & \vdots & \ddots & \vdots \\ A_x & A_x & \cdots & A_x \end{bmatrix}$$

where $A_1$ through $A_x$ are the plurality of N by N matrices.

20. The method of claim 17, with the output matrix being generated by:
generating an M by M spreading matrix which is a Kronecker product of an N by N orthogonally spreading matrix and an X by X matrix with all elements being 1; and
orthogonally spreading the M by M code matrix by an element-wise multiplication of the M by M code matrix and the M by M spreading matrix.

21. A method for data transmission, the method comprising the steps of:
modulating data to be transmitted into a plurality of modulated symbols;
dividing the plurality of modulated symbols into a plurality of subsets of modulated symbols, with each subset having N modulated symbols, and N being an integer no smaller than 2;

encoding each subset of modulated symbols in accordance with a transmission diversity scheme to produce a plurality of N by N matrices, with each N by N matrix corresponding to each subset of modulated symbols;

generating a M by M code matrix C, with C being established by:

$$C = \begin{bmatrix} A_1 & A_1 & \cdots & A_1 \\ A_2 & A_2 & \cdots & A_2 \\ \vdots & \vdots & \ddots & \vdots \\ A_x & A_x & \cdots & A_x \end{bmatrix}$$

where $A_1$ through $A_x$ are the plurality of N by N matrices, X is the number of the plurality of N by N matrices, and M=N×X;

orthogonally spreading the M by M code matrix to generate an output matrix;

generating a set of row-permuted matrixes based upon the output matrix, each row-permuted matrix being generated by exchanging a selected pair of rows in the output matrix;

selecting a subset of K row-permuted matrices; and segregating available transmission resources into a plurality of frequency sub-carriers;

dividing the plurality of sub-carriers into a plurality of sets of continuous sub-carriers, each set of sub-carriers comprising M sub-carriers;

selecting a subset of K row-permuted matrices to be mapped into the transmission resources;

repeatedly mapping the selected set of K row-permuted matrices into the plurality of sets of sub-carriers, with each set of M sub-carriers corresponding to a row-permuted matrix; and transmitting the symbols in the selected row-permuted matrices using the corresponding sub-carriers via a plurality of antennas in different time slots.

22. A transmitter configured to transmit data, the transmitter comprising:

a modulator configured to modulate data to be transmitted into a plurality of sets of M modulated symbols;

a precoding unit configured to divide the plurality of modulated symbols into a plurality of subsets of N modulated symbols, with M=N×X, and X is the quantity of the subsets of N modulated symbols, encode each subset of N modulated symbols in accordance with a transmission diversity scheme to result in a plurality of N by N matrices, with each N by N matrix corresponding to each subset of modulated symbols, and generate an M by M code matrix comprising the plurality of N by N matrices;

a spreading unit configured to orthogonally spread the M by M code matrix to generate an output matrix;

a permutation unit configured to select a set of K output matrices from among generated output matrices, generate a set of K row-permuted matrixes based upon a corresponding output matrix within the set of K output matrices, with each row-permuted matrix being generated by using a selected row-permutation scheme, and row permutation schemes used by different matrices being different;

a mapping unit configured to segregate available transmission resource into a plurality of frequency sub-carriers, divide the plurality of frequency sub-carriers into a plurality of sets of M continuous sub-carriers, and repeatedly map a selected set of K row-permuted matrices into the plurality of sets of M sub-carriers, with each set of M sub-carriers corresponding to a row-permuted matrix; and a plurality of antennas configured to transmit symbols in the set of K row-permuted matrices using corresponding sub-carriers.

23. The transmitter of claim 22, wherein the mapping unit is further configured to map the symbols in a selected subset of the plurality of row-permuted matrices into available transmission resources.

24. The transmitter of claim 22, wherein the mapping unit is further configured to repeatedly map the symbols in a selected subset of the plurality of row-permuted matrices into a plurality of frequency sub-carriers of the transmission resources.

25. The transmitter of claim 22, wherein the mapping unit is further configured to repeatedly map the symbols in a selected subset of the plurality of row-permuted matrices into a plurality of time slots of the transmission resources.

26. The transmitter of claim 22, wherein the transmitter is further configured to transmit the symbols in the plurality of row-permuted matrices in response to a negative acknowledgement signal received from a receiver.

27. A transmitter configured to transmit data, the transmitter comprising:

a modulator configured to modulate data to be transmitted into a plurality of modulated symbols;

a precoding unit configured to divide the plurality of modulated symbols into a plurality of subsets of modulated symbols, with each subset having N modulated symbols, and N being an integer no smaller than 2, encode each subset of modulated symbols in accordance with a transmission diversity scheme to produce a plurality of N by N matrices, with each N by N matrix corresponding to each subset of modulated symbols, generate a first M by M code matrix comprising the plurality of N by N matrices, with M=N×X and X is the number of the plurality of N by N matrices, and generate a second M by M code matrix by exchanging at least one selected pair of rows in the first M by M code matrix;

a spreading unit configured to orthogonally spread the first M by M code matrix to generate a first output matrix and the second M by M code matrix to generate a second output matrix; and a plurality of antennas configured to transmit symbols in the first output matrix in a first time slot and symbols in the second output matrix via the plurality of antennas in a second time slot.

* * * * *